F. N. SPELLER.
METHOD OF REDUCING THE CORROSIVE ACTION OF WATER.
APPLICATION FILED DEC. 3, 1907.
900,323.
Patented Oct. 6, 1908.
2 SHEETS—SHEET 1.
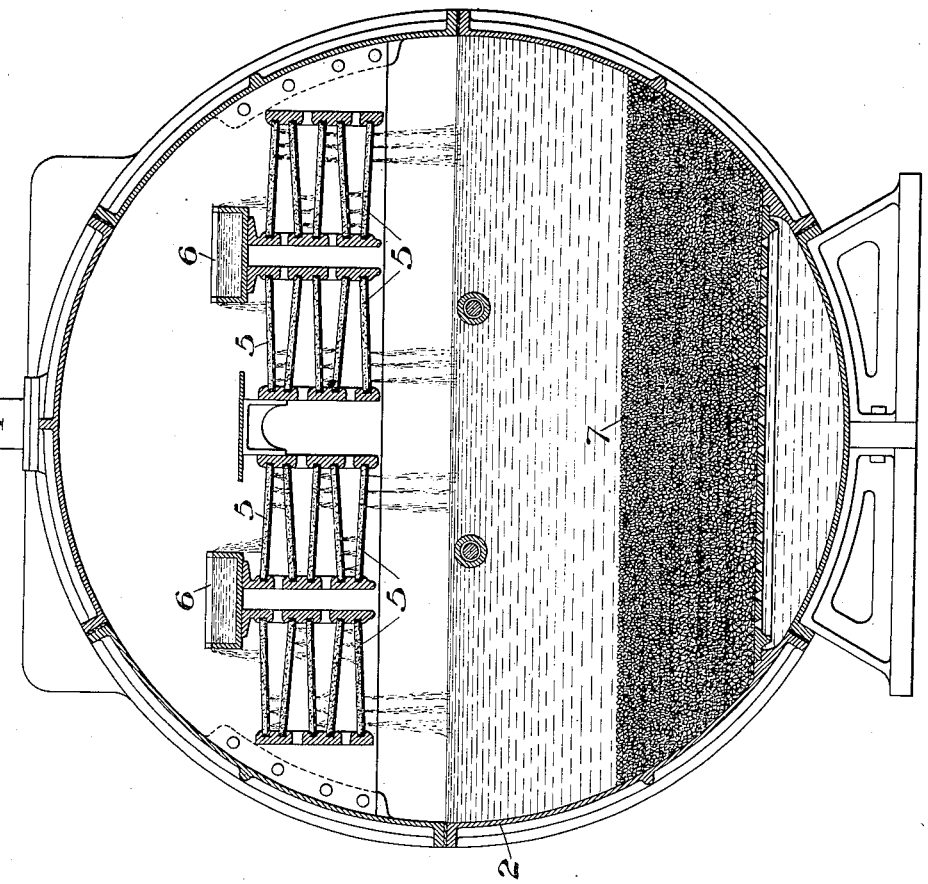
WITNESSES
INVENTOR F. N. SPELLER.
METHOD OF REDUCING THE CORROSIVE ACTION OF WATER.
APPLICATION FILED DEC. 3, 1907.
900,323.
Patented Oct. 6, 1908.
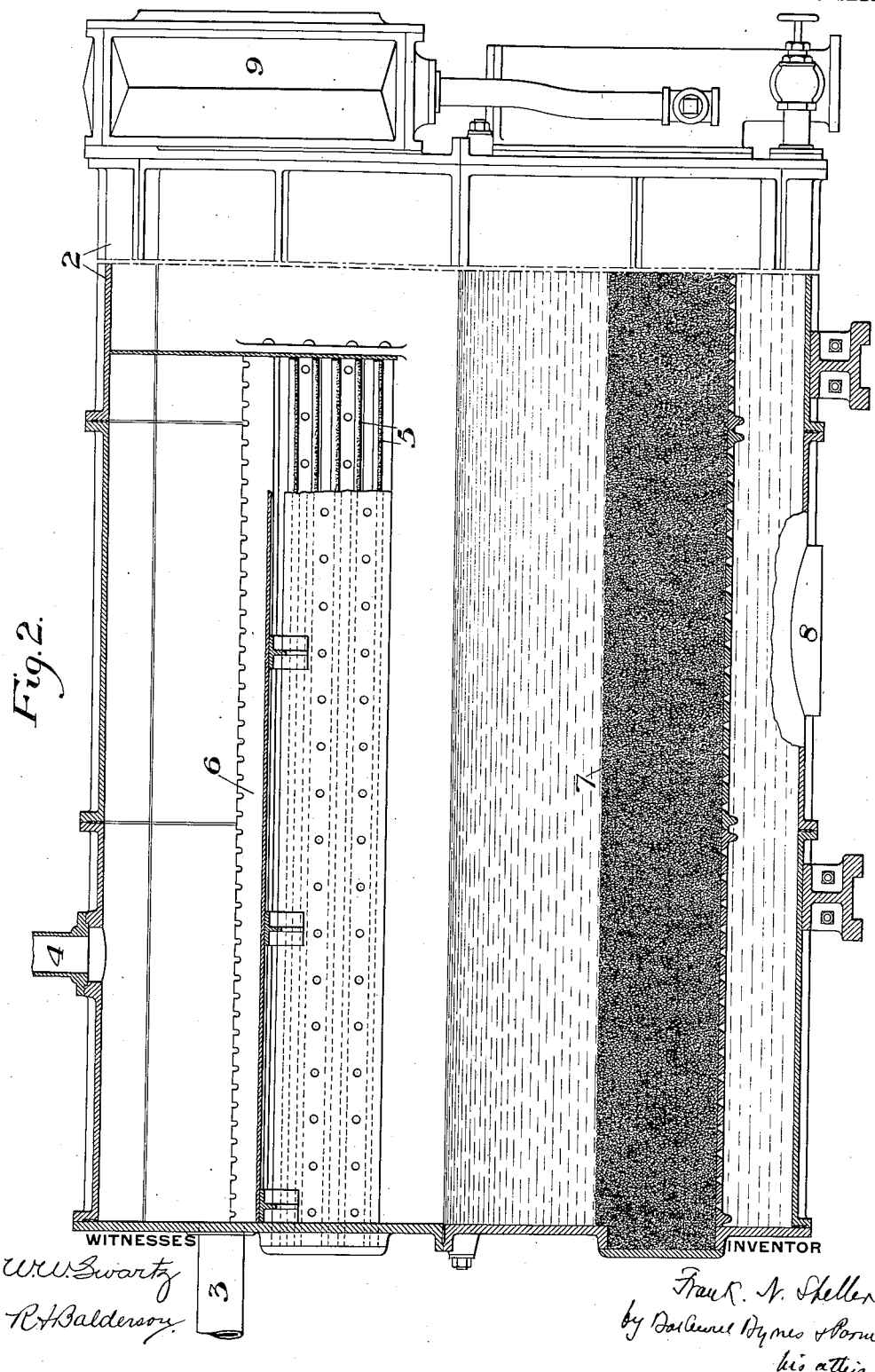

UNITED STATES PATENT OFFICE.

FRANK N. SPELLER, OF PITTSBURG, PENNSYLVANIA.

METHOD OF REDUCING THE CORROSIVE ACTION OF WATER.

No. 900,323.　　　Specification of Letters Patent.　　　Patented Oct. 6, 1908.

Application filed December 3, 1907. Serial No. 404,957.

*To all whom it may concern:*

Be it known that I, FRANK N. SPELLER, of Pittsburg, Allegheny county, Pennsylvania, have invented a new and useful Method of Reducing the Corrosive Action of Water, of which the following is a full, clear, and exact description.

My invention relates to reducing or preventing the corrosion of boilers, hot water heating systems, &c.; and the object of the invention is to remove corrosive constituents, such as dissolved oxygen and carbonic acid from the water, at least in large part.

In carrying out my invention, I bring the artificially heated water in contact with a large surface of finely divided iron, such as turnings or borings. The contact of the heated water with the iron surfaces forms oxids and other compounds of iron from the gases carried in solution, so that after such treatment the water may be used in boilers or pipes of heating systems without causing corrosion, or at least with great reduction in the amount of corrosion.

In the drawings, Figure 1 is a cross section of a feed water heater arranged to carry out my process; and Fig. 2 is a sectional side elevation of the same.

In these drawings, in which I show a Cochrane feed-water heater arranged for carrying out my invention, 2 represents the cylindrical shell of the heater, 3 the feed-water inlet pipe, 4 the vane for the surplus steam, and 5 the shelves or trays from which the water trickles from the feed troughs 6. These trays are provided with holes, and are arranged at opposite inclinations so that the water flows along one trough laterally, then drops down the next and flows along it, and so on. In these troughs I place the scrap iron, preferably in the form of borings or turnings, so that the water heated by the exhaust steam will be freed from its dissolved oxygen and carbonic acid gas. In order to insure more complete extraction of these gases I may employ a lower bed 7 extending over the bottom portion of the heater, and which is preferably composed of coke mixed with the finely divided iron. The coke in this case merely acts as an inert substance to separate the iron particles and prevent caking. Any inert substance will serve for this purpose. The water may be taken out through the bottom outlet 8, and the steam may be fed in the ordinary manner through the separator 9, by which the oil is removed. From this feed-water heater, the purified and heated water is fed to the boilers, and as the gases which set up corrosion have been removed the corrosion in the boiler is greatly reduced. The same effect may be produced to a considerable extent by providing finely divided iron within the boiler passes. This iron may be supplied in the form of finely divided iron contained in basins or trays, which are preferably hung near the feed-water entrance. I prefer, however, to bring the heated water in contact with the iron in an auxiliary vessel, such as a feed-water heater, before it enters the boiler.

The advantages of my process will be apparent to those skilled in the art. The rapid corrosion of boilers and hot-water heating systems is prevented or greatly reduced, while there is little or no expense in causing this removal of the dissolved oxygen and carbonic acid. As the scrap iron becomes converted into hydroxids and salts, the trays may be removed and fresh borings or turnings supplied.

Many changes may be made in the form and arrangement of the apparatus employed, without departing from my invention, since I consider myself the first to bring heated water in contact with finely divided iron surfaces and thereby remove the dissolved oxygen and carbonic oxid.

I claim:—

1. The method of reducing the corrosive action of water, consisting in heating the water and bringing it in contact with finely divided iron; substantially as described.

2. The method of reducing the corrosive action of water, consisting in feeding the water while heated over successive separated bodies of finely divided iron, and then feeding the water into heating systems; substantially as described.

In testimony whereof, I have hereunto set my hand.

FRANK N. SPELLER.

Witnesses:
  JOHN MILLER,
  H. M. CORWIN.